(12) United States Patent
Smits

(10) Patent No.: US 7,551,814 B1
(45) Date of Patent: Jun. 23, 2009

(54) OPTICAL DETECTION OF USER INTERACTION BASED ON EXTERNAL LIGHT SOURCE

(75) Inventor: Gerard Dirk Smits, Los Gatos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 667 days.

(21) Appl. No.: 11/358,341

(22) Filed: Feb. 21, 2006

(51) Int. Cl.
*G02B 6/28* (2006.01)
*G06F 3/042* (2006.01)

(52) U.S. Cl. .............................. 385/24; 385/14; 385/88; 385/92; 385/901; 345/173; 345/176

(58) Field of Classification Search .................. 385/88, 385/89, 92, 93, 94, 14, 147, 31, 27, 39, 38, 385/115, 116, 134, 901, 900, 24; 323/221, 323/236, 902, 904; 345/173, 174, 175, 176
See application file for complete search history.

(56) References Cited

U.S. PATENT DOCUMENTS

| | | | |
|---|---|---|---|
| 3,584,226 | A | 6/1971 | Lerner |
| 3,832,028 | A | 8/1974 | Kapron |
| 4,068,121 | A | 1/1978 | Bringhurst et al. |
| 4,262,996 | A | 4/1981 | Yao |
| 4,367,916 | A | 1/1983 | Mottier et al. |
| 4,440,468 | A | 4/1984 | Auracher et al. |
| 4,737,626 | A | 4/1988 | Hasegawa |
| 4,746,770 | A | 5/1988 | McAvinney |

(Continued)

FOREIGN PATENT DOCUMENTS

EP 0569181 11/1993

(Continued)

OTHER PUBLICATIONS

Non-final Office Action dated Aug. 25, 2005 for U.S. Appl. No. 10/758,759, filed Jan. 15, 2004.

(Continued)

*Primary Examiner*—Brian M Healy
(74) *Attorney, Agent, or Firm*—Darby & Darby PC; John W. Branch

(57) ABSTRACT

An apparatus for employing ambient light collected from an external light source to detect a user's fingers that are gripping at least a relatively transparent portion of a case. The ends of a plurality of waveguides are coupled at relatively unequal or equidistant positions to the interior surface of the transparent portion, where they are arranged to collect light from the exterior light source if the user's finger(s) are not gripping the mobile device at that position. If the light collected by the wave guides is blocked by one or more of the user's fingers, a profile can be determined for the placement, orientation (left handed or right handed), and size of the user's fingers and hand gripping the mobile device. Also, interactions of the fingers with the mobile device can be detected, such as lifting away, pressing, or sliding one or more fingers at the transparent portion for a short or relatively lengthy period of time. Additionally, the collected light can be provided by one or more external light sources, such as ambient light from remotely located sources, one or more illuminators within a mobile device such as a back light for a display, control or other element.

23 Claims, 7 Drawing Sheets

U.S. PATENT DOCUMENTS

| | | | |
|---|---|---|---|
| 4,776,661 A | 10/1988 | Handa | |
| 5,050,946 A | 9/1991 | Hathaway et al. | |
| 5,235,193 A | 8/1993 | Hurlimann | |
| 5,414,413 A | 5/1995 | Tamaru et al. | |
| 5,432,877 A | 7/1995 | Sun et al. | |
| 5,512,943 A | 4/1996 | Bahnemann et al. | |
| 5,540,612 A | 7/1996 | Mendez et al. | |
| 5,604,835 A | 2/1997 | Nakamura et al. | |
| 5,635,724 A | 6/1997 | Higgins | |
| 5,668,913 A | 9/1997 | Tai et al. | |
| 5,719,973 A | 2/1998 | Monroe et al. | |
| 5,786,810 A | 7/1998 | Knox et al. | |
| 5,850,498 A | 12/1998 | Shacklette et al. | |
| 5,914,709 A | 6/1999 | Graham et al. | |
| 6,181,842 B1 | 1/2001 | Francis et al. | |
| 6,341,189 B1 | 1/2002 | Deacon | |
| 6,351,260 B1 | 2/2002 | Graham et al. | |
| 6,362,861 B1* | 3/2002 | Hertz et al. | 349/69 |
| 6,456,766 B1 | 9/2002 | Shaw et al. | |
| 6,470,130 B1 | 10/2002 | Walker et al. | |
| 6,525,677 B1 | 2/2003 | Printzis | |
| 6,555,288 B1 | 4/2003 | Xu et al. | |
| 6,734,929 B2 | 5/2004 | Sugiura et al. | |
| 6,810,160 B2 | 10/2004 | Sugama et al. | |
| 6,835,923 B2* | 12/2004 | Hamalainen et al. | 250/227.11 |
| 6,957,007 B2 | 10/2005 | Balch et al. | |
| 7,084,859 B1* | 8/2006 | Pryor | 345/173 |
| 7,210,860 B2* | 5/2007 | Marcinkiewicz et al. | 385/88 |
| 7,352,930 B2* | 4/2008 | Lowles | 385/31 |
| 2002/0052209 A1* | 5/2002 | Frohlund | 455/456 |
| 2003/0203315 A1 | 10/2003 | Farahi et al. | |
| 2003/0231851 A1 | 12/2003 | Rantala et al. | |
| 2004/0076382 A1 | 4/2004 | Saia et al. | |
| 2004/0201579 A1 | 10/2004 | Graham | |
| 2005/0089298 A1 | 4/2005 | Maxwell et al. | |
| 2005/0201681 A1 | 9/2005 | Payne | |
| 2005/0271319 A1 | 12/2005 | Graham | |
| 2005/0271326 A1 | 12/2005 | Luo | |
| 2005/0271983 A1 | 12/2005 | Payne | |
| 2006/0025218 A1 | 2/2006 | Hotta | |
| 2007/0103453 A1* | 5/2007 | Choo et al. | 345/173 |

FOREIGN PATENT DOCUMENTS

| | | |
|---|---|---|
| EP | 0901065 | 3/1999 |
| EP | 1271211 | 1/2003 |
| EP | 1298462 | 4/2003 |
| EP | 1413976 | 4/2004 |
| JP | 2001-267180 | 9/2001 |
| JP | 2005-010684 | 1/2005 |
| WO | WO 02/095668 | 11/2002 |
| WO | WO 03/071323 | 8/2003 |
| WO | WO 2004/093045 | 10/2004 |
| WO | WO 2005/121853 | 12/2005 |

OTHER PUBLICATIONS

Chen, R. T., "Polymer-based Photonic Integrated Circuits," *Optics & Laser Technology*, 25(6):347-365 (1993).

* cited by examiner

OPTICAL DETECTION OF USER INTERACTION BASED ON EXTERNAL LIGHT SOURCE

FIELD OF THE INVENTION

The invention is directed to an optical user interface for a device, and more particularly, for employing waveguides to detect the position of a finger of a user that is gripping the mobile device.

BACKGROUND OF THE INVENTION

User interfaces for electronic devices have typically employed on a variety of mechanisms to detect the interaction of a digit of a user's hand with a control. For example, either singly or in combination, capacitive sensors, touch pressure sensitive displays, mechanical switches, and touch optical displays have been used as a mechanism to detect affirmatic interaction by a user with an interface. However, these mechanisms usually require the user to adapt to a predetermined right handed orientation regardless if the user is left handed. Also, these mechanisms are often arranged to accommodate the "typical" size of a user's finger tip. Consequently, the usual arrangement of these mechanisms can make it inconvenient for users with non-standard sized fingers (large or small) and/or left handed to affirmatively interact with a user interface. Additionally, these mechanisms are subject to various forms of mechanical failure and can require energization to enable detection of an affirmative interaction by a user.

Portable (mobile) devices are often designed to be relatively small, consume relatively less power, and weigh considerably less than stationary devices. Also, since a mobile device is often operated by a user in different environments such as work and home, personalization features are desirable. However, the current mechanisms used to detect and customize user interaction with a mobile device are not always compatible with these considerations.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DETAILED DESCRIPTION OF THE INVENTION

Figure 1A:
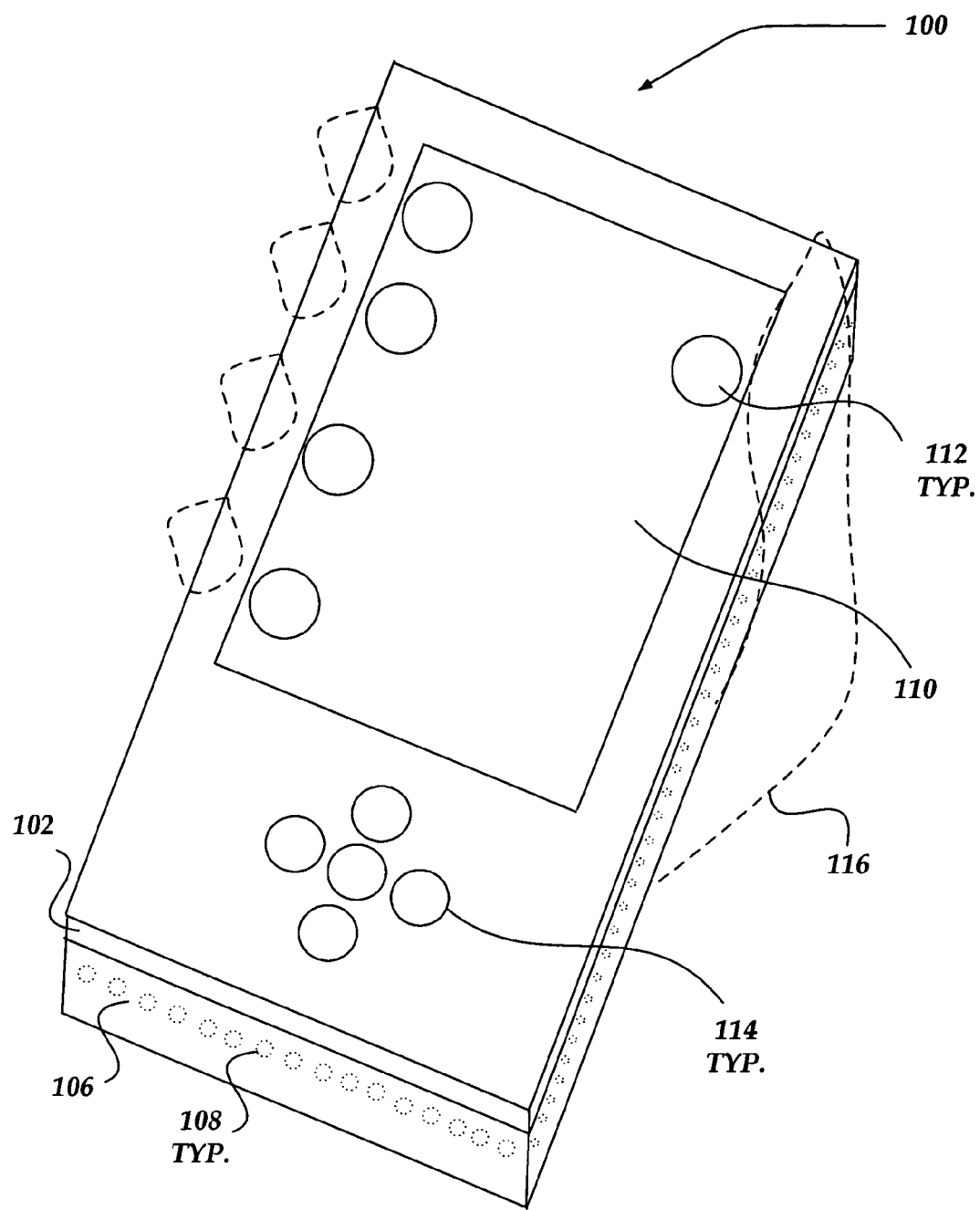
FIG. 1A is a perspective view of an exemplary mobile device with an optical interface disposed below the top portion of a case with visual indicia that are arranged for a right handed user.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The invention is generally directed to an apparatus and method for employing the absence of light from an external source to optically detect a user's fingers that are gripping at least a relatively transparent portion of a mobile device. The ends of a plurality of waveguides can be coupled at relatively unequal or equidistant positions to the interior surface of the transparent portion, where they are arranged to collect light from an exterior light source if the user's fingers are not gripping the mobile device at that position. If the light collected by the wave guides is blocked by one or more of the user's fingers, a profile can be determined for the placement, orientation (left handed or right handed), and size of the user's fingers gripping the mobile device. Also, interactions of the fingers with the mobile device can be detected, such as lifting away (or pressing) one or more fingers from the transparent portion for a short or relatively lengthy period of time. Additionally, the collected light can be provided by one or more external light sources, such as ambient light from remotely located sources, or one or more illuminators within the mobile device such as a back light for a display, control or other element.

Typically, an optical processor receives the collected light as an analog signal from the opposite ends of the waveguides that collect the light, and converts this analog signal into a digital signal that can be employed by the mobile device for various uses. For example, the mobile device can determine a profile of the user's fingers gripping the mobile device and interactions by each finger with the mobile device. These interactions can include changes in position, such as lifting away, sliding, or pressing by one or more fingers in regard to the transparent portion of the mobile device's case. Also, the collected light can be arranged at one or more bandwidths, including, but not limited to, visual light, infra-red, and ultra violet.

In one embodiment, one or more visual indicators such as "soft keys" can be presented on a display for the mobile device at an orientation, position, and size that is based at least in part on the determined profile for the user's fingers gripping the mobile device. The soft keys can be arranged as a visual indication of at least one operation that can occur if the user's corresponding finger is interactively lifting away, sliding, or pressing against the transparent portion of the mobile device's case.

In another embodiment, other visual indicators for mobile device operations can be positioned in the display adjacent to the positions of the user's fingers gripping the mobile device, e.g., icons, images, pictures, colors, symbols, illustrations, animations, videos, and the like. The type of visual indicators and their quantity (can be more or less than the number of fingers gripping) that are presented on the display are determined in part by the particular application that is operated by the interactive lifting of the user's fingers at the transparent portion of the mobile device's case.

In yet another embodiment, one or more visual indicia and an animated visual representation of the user's hand gripping the mobile device can be displayed on a remotely located display. The remotely displayed visual indicia and visual representation can be associated with the physical interaction of the user's hand gripping the mobile device and functions that are performed either locally or remotely by applications. Also, fixed indicators can be disposed at relatively stationary positions on the mobile device. These fixed indicators can include electro-fluorescent lamps, Light Emitting Diodes (LEDs), electric discharge lamps, and the like.

Additionally, for all embodiments, the invention can generally provide a relatively non-conductive, inert, moisture resistant, reliable, and non-mechanical interface for operations associated with a mobile device. Also, an automatic gain control circuit can be provided to improve operation in external environments with differing ambient light conditions. The automatic gain control circuit can provide automatic electronic shuttering and/or calibration of the collected ambient light. Additionally, the collected ambient light can be provided by one or more external light sources, and/or one or more illuminated features of the mobile device such as a back light for a display, control or other element.

FIG. 1A illustrates a perspective view of mobile device 100 that is arranged to accommodate interactive operations from a right handed user's fingers gripping the mobile device. Although the actual open palm and fingers of the user are not shown here, the orientation on display 110 of visual indicators 112 is based on the user's grip of the mobile device. Typically, the position of a thumb disposed across from the other fingers gripping the mobile device is employed to determine a left or right hand orientation. As shown, right hand 116 is gripping mobile device 100.

Also, visual indicators 112 are sized and positioned to indicate an operation that is initiated by the lifting away, sliding, and/or gripping by one or more corresponding fingers that are positioned against a relatively transparent optical interface 106 of mobile device 100. Optical interface 106 is sandwiched against top portion 102 to form a case for mobile device 100. Although the waveguides are not shown here, an exemplary end 108 of each waveguide is shown in relief (dotted line) positioned on the interior surface optical interface 106 in such a way that it can collect light from a light source that is external to the mobile device if a finger is lifted and not collect light if the finger is gripping the mobile device.

Additionally, controls 114 are physically disposed at fixed positions in top portion 102 of the mobile device. Also, controls 114 are employable to operate one or more applications for mobile device 100. Controls 114 can include transparent or semi-transparent material such as a lens that is coupled by one or more waveguides to optical interface 106. The transparent material can include, plastic, vinyl, glass, and the like. As a finger is pressed against each lens, the absence of, or reduction in light communicated by the waveguide(s) is detectable.

Figure 1B:
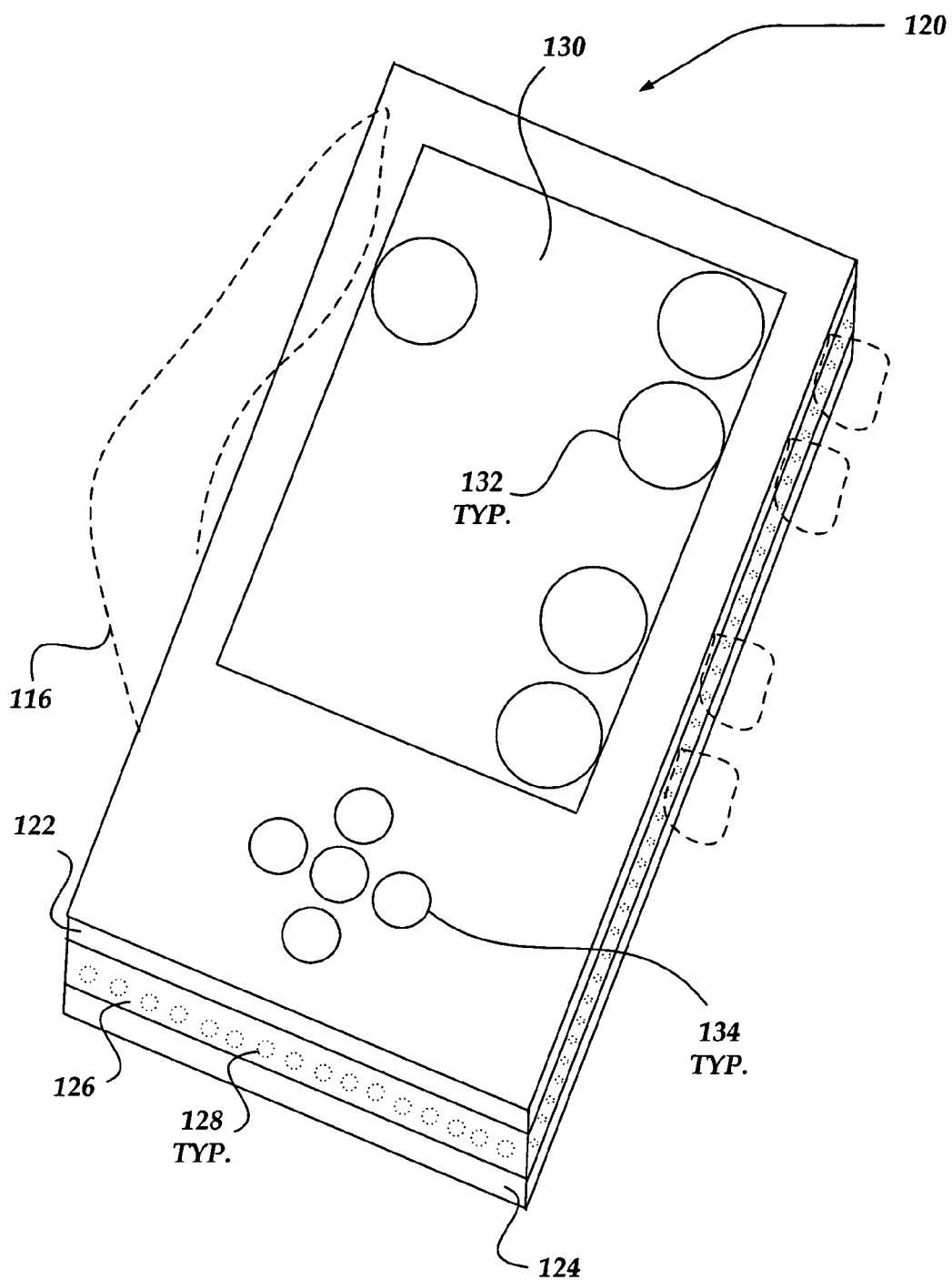
FIG. 1B is a perspective view of an exemplary mobile device with an optical interface disposed between the top and bottom portions of a case with visual indicia that are arranged for a left handed user.

FIG. 1B illustrates a perspective view of mobile device 120 that is arranged to accommodate interactive operations from a left handed user's fingers gripping the mobile device in a manner substantially similar to FIG. 1A, albeit different. In particular, the size of a different user's fingers gripping mobile device 120 is substantially bigger than the user fingers gripping mobile device 100. Consequently, the size and arrangement of visual indicators 132 on display 130 reflect the different finger size and positions of the different user. Although the actual open palm and fingers of the different user are not shown here, the orientation on display 130 of soft keys 132 is based on the different user's grip of the mobile device. As shown, left hand 116 is gripping mobile device 120.

Also, visual indicators 132 are sized and positioned to identify an operation that is initiated by the lifting away, sliding, and/or gripping by one or more corresponding fingers that are positioned against transparent portion 126 of mobile device 120. Relatively transparent optical interface 126 is sandwiched between the top portion 122 and bottom portion 124 to form a case for mobile device 120. Although the waveguides are not shown here, an exemplary end 128 of each waveguide is shown in relief (dotted line) positioned on the interior surface of optical interface 126 in such a way that it can collect light from a source that is external to the mobile device.

Additionally, controls 134 are physically disposed at fixed positions in top portion 122 of mobile device 120. Also, controls 134 are employable to operate one or more applications for mobile device 120. Controls 134 can include transparent or semi-transparent material such as a lens that is coupled by one or more waveguides to an optical processor, and the like. The transparent material can include plastic, vinyl, glass, and the like. As a finger is pressed against each lens, the absence of, or reduction in light communicated by the waveguide(s) is detectable.

Figure 1C:
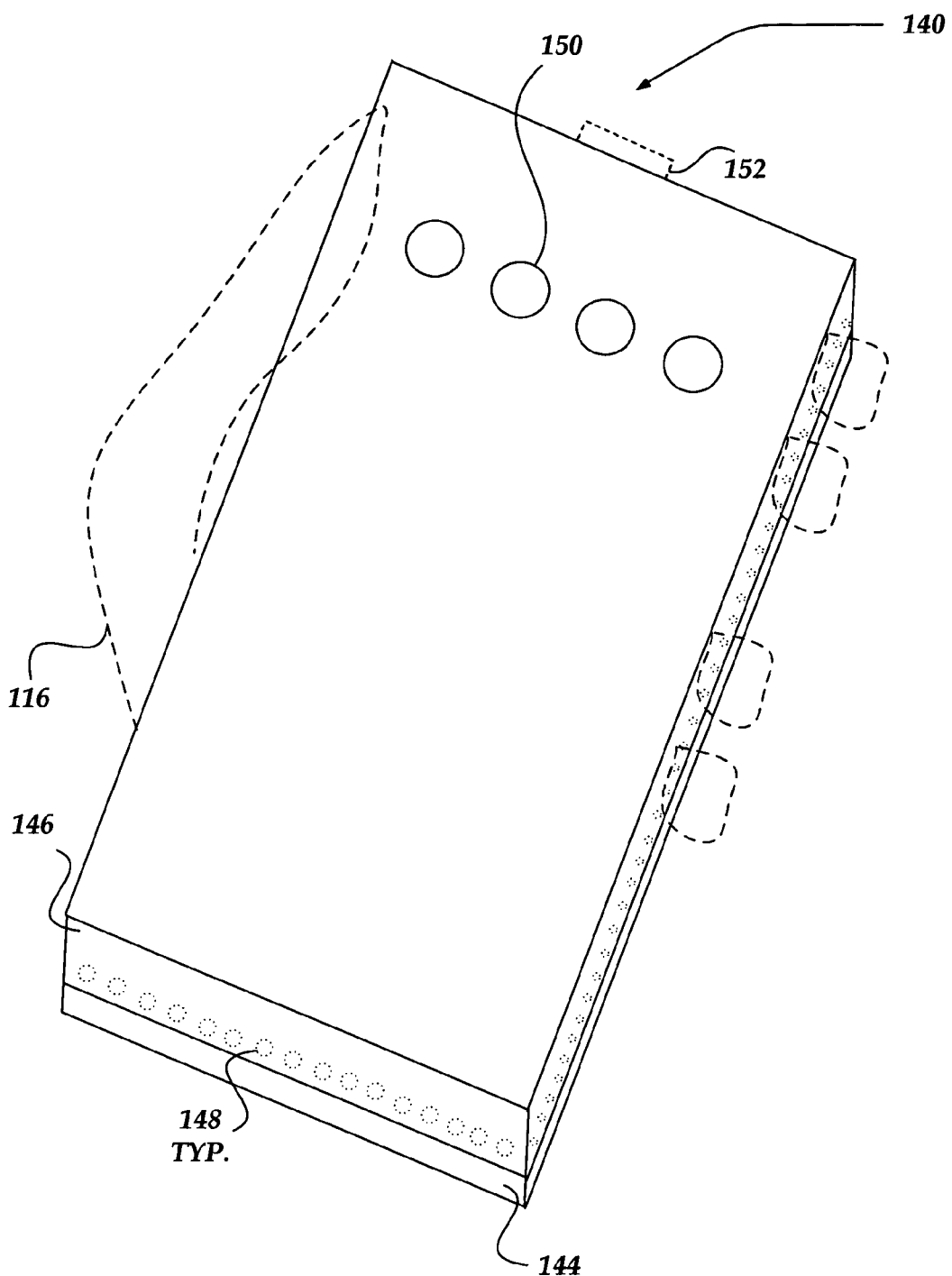
FIG. 1C is a perspective view of an exemplary mobile device with an optical interface disposed above the bottom portion of a case with lamped indicators that is gripped by a left handed user.

FIG. 1C illustrates a perspective view of mobile device 140 that is arranged to accommodate interactive operations from a right handed user's fingers gripping the mobile device. Although the actual open palm and fingers of the user are not shown here, the orientation on a remotely located display of visual indicators is based on the user's grip of the mobile device. (See FIG. 1D). Typically, the position of a thumb disposed across from the other fingers gripping the mobile device is employed to determine a left or right hand orientation. As shown, left hand 116 is gripping mobile device 140.

Also, controls 150 are sized and positioned to indicate or initiate an operation that is initiated by the lifting away, sliding, and/or gripping by one or more corresponding fingers that are positioned against transparent portion 146 or controls 150. Relatively transparent optical interface 146 is sandwiched against bottom portion 144 to form a case for mobile device 140. Although the waveguides are not shown here, an exemplary end 148 of each waveguide is shown in relief (dotted line) positioned on the interior surface of transparent portion 146 in such a way that it can collect light from a light source that is external to the mobile device if a finger is lifted and not collect light if the finger is gripping the mobile device.

Additionally, controls 150 are physically disposed at fixed positions in optical interface 146 of the mobile device. Also, controls 150 are employable to operate one or more applications for mobile device 140. Controls 150 can include transparent or semi-transparent material such as a lens that is coupled by one or more waveguides to an optical processor, and the like. The transparent material can include plastic, vinyl, glass, and the like. As a finger is pressed against each lens, the absence of, or reduction in light communicated by the waveguide(s) is detectable.

Figure 1D:
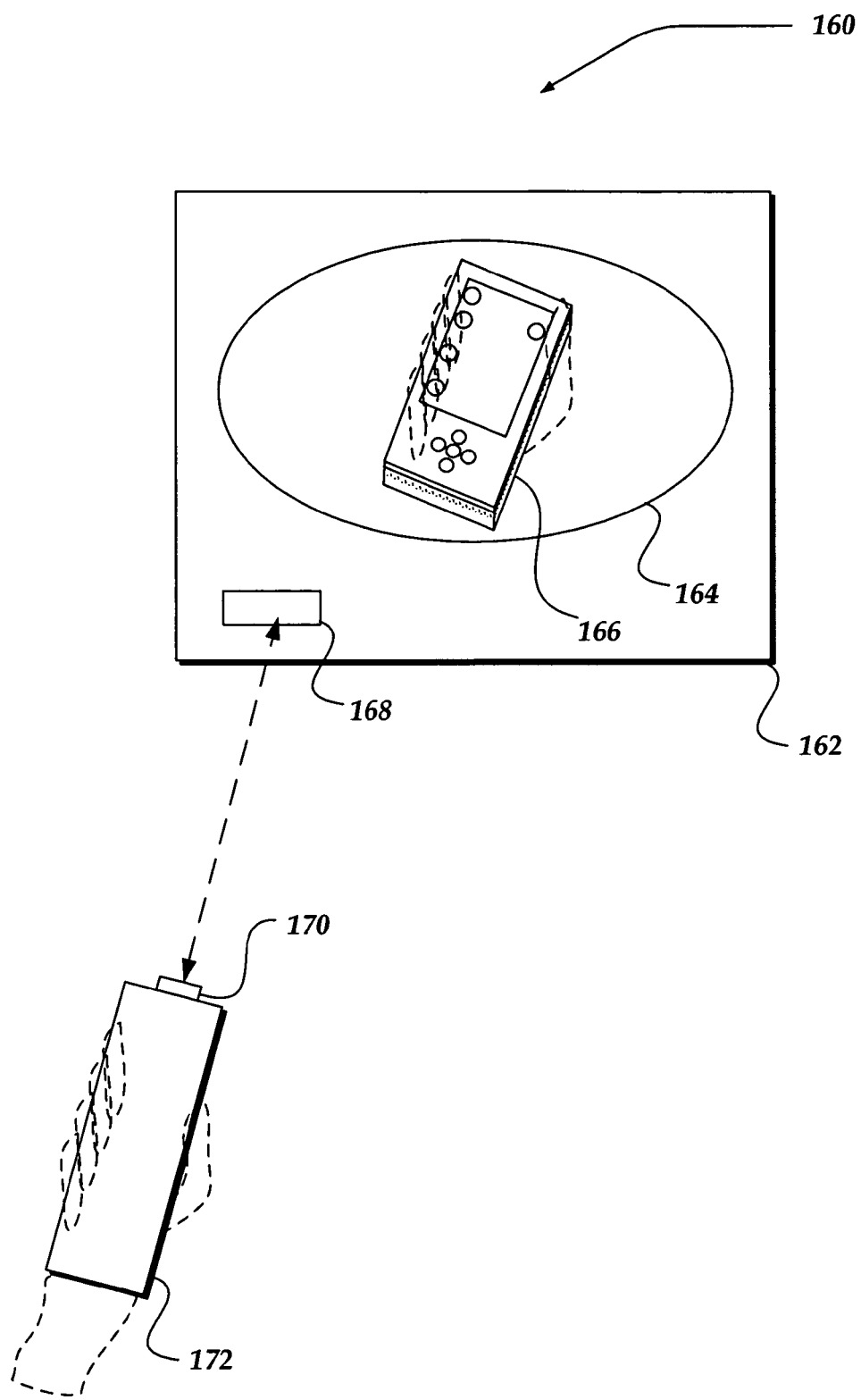
FIG. 1D is a perspective view of an exemplary mobile device that is employed as a remote control and functions associated with the grip of each finger holding the mobile device are displayed on a remotely located display.

FIG. 1D illustrates a perspective view of system 160 that enables mobile device 172 to be employed as a remote controller for remotely located electronic device 162. The grip of each finger holding mobile device 172 is determined by the absence of light collected by waveguides and communicated to remotely located device 162 where visual representation 166 of an animated virtual user's hand gripping a virtual mobile device with virtual visual indicia are oriented and displayed on remote display 164. In at least one embodiment, the virtual hand, virtual fingers, virtual mobile device, and/or virtual visual indicia are animated based at least in part on the determined physical interaction of the user's fingers and hand(s) with the optical interface and/or an application.

Wireless transceiver 170 is configured to communicate both the arrangement of each finger gripping mobile device 172, and the interaction of each finger with the mobile device. Also, wireless transceiver 170 for mobile device 172 enables wireless communication with wireless transceiver 168 for remotely located device 162. Wireless communication is enabled with signals that can include at least one of radio frequency signals, acoustic signals, visible light signals, infrared light signals, or laser light signals.

In another embodiment, additional elements can be included to operate in combination wit the optical interface or in place of the optical interface for detecting the interaction of a user's fingers with mobile device 172. These elements could include any combination of capacitive switches, resistive switches, electro-mechanical switches, and the like.

Figure 2:
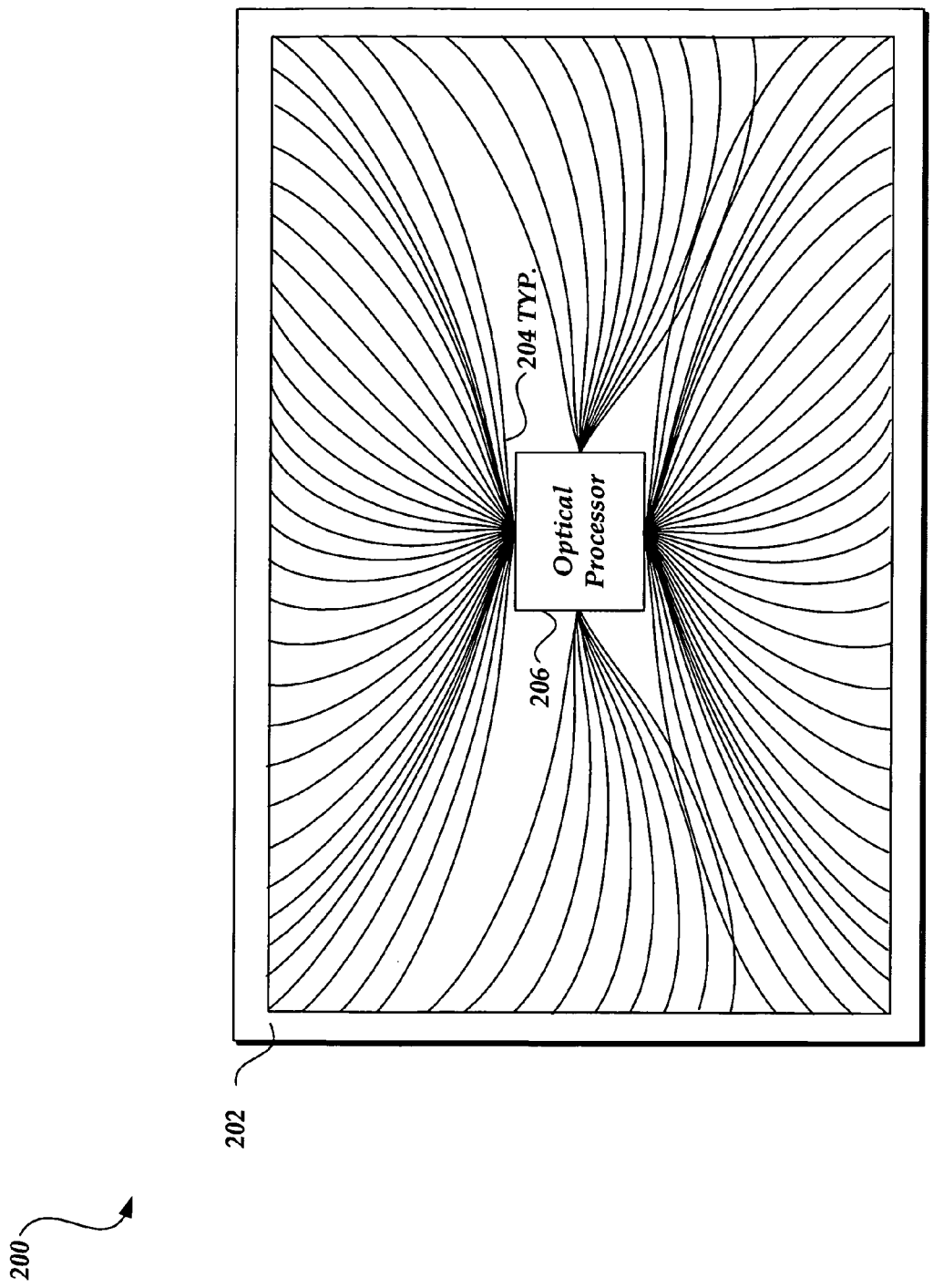
FIG. 2 is a plan view of an optical interface that includes a bezel coupled to a plurality of waveguides and an optical processor.

FIG. 2 illustrates a plan view of a relatively transparent optical interface 200 that is configured to be attached to a case for the mobile device (not shown). Transparent portion 202 can be formed entirely of a transparent or translucent material. However, in some embodiments, portions of transparent portion 202 may be transparent where fingers are most likely to be positioned to grip the case of the mobile device, and non-transparent or semi-transparent in other portions of the transparent portion. In some embodiments, transparent portion 202 may be formed as a bezel.

A plurality of wave guides 204 are arranged so that one end of each wave guide is coupled to the inside surface of transparent portion 202 at relatively equidistant positions and each other end is coupled to optical processor 206. Optical processor 206 converts the collected light provided through the wave guides into digital signals that can be subsequently processed by applications executing on the mobile device (not shown here).

Additionally, optical processor 206 can be arranged with one or more sub components such as a converter for light into an analog signal, an analog to digital converter, and/or a digital signal processor. Optical processor 206 can also be arranged with automatic gain control that operates as an electronic shutter to enable the optical processor to process collected light in a wide variety of lighting conditions, e.g., bright daylight, and relatively low interior lighting.

Furthermore, the waveguides are often formed into a fiber from an optically suited material, e.g., glass, silica, silicon, plastic, composite materials, and the like. The waveguide fiber is formed with optical characteristics that enable the collection and transmission of light from one end of the fiber attached to the inside surface of the transparent portion to another end coupled to the optical processor. Also, the ends of the waveguides are typically positioned at intervals on the inside surface of transparent portion 202 that are substantially less than the width of a typical finger tip. For example, a finger tip is often 10 millimeters or more wide, but the distant between the ends of the wave guides coupled to the inner surface of transparent portion 202 is usually less than this distance.

Illustrative Mobile Device

Figure 3:
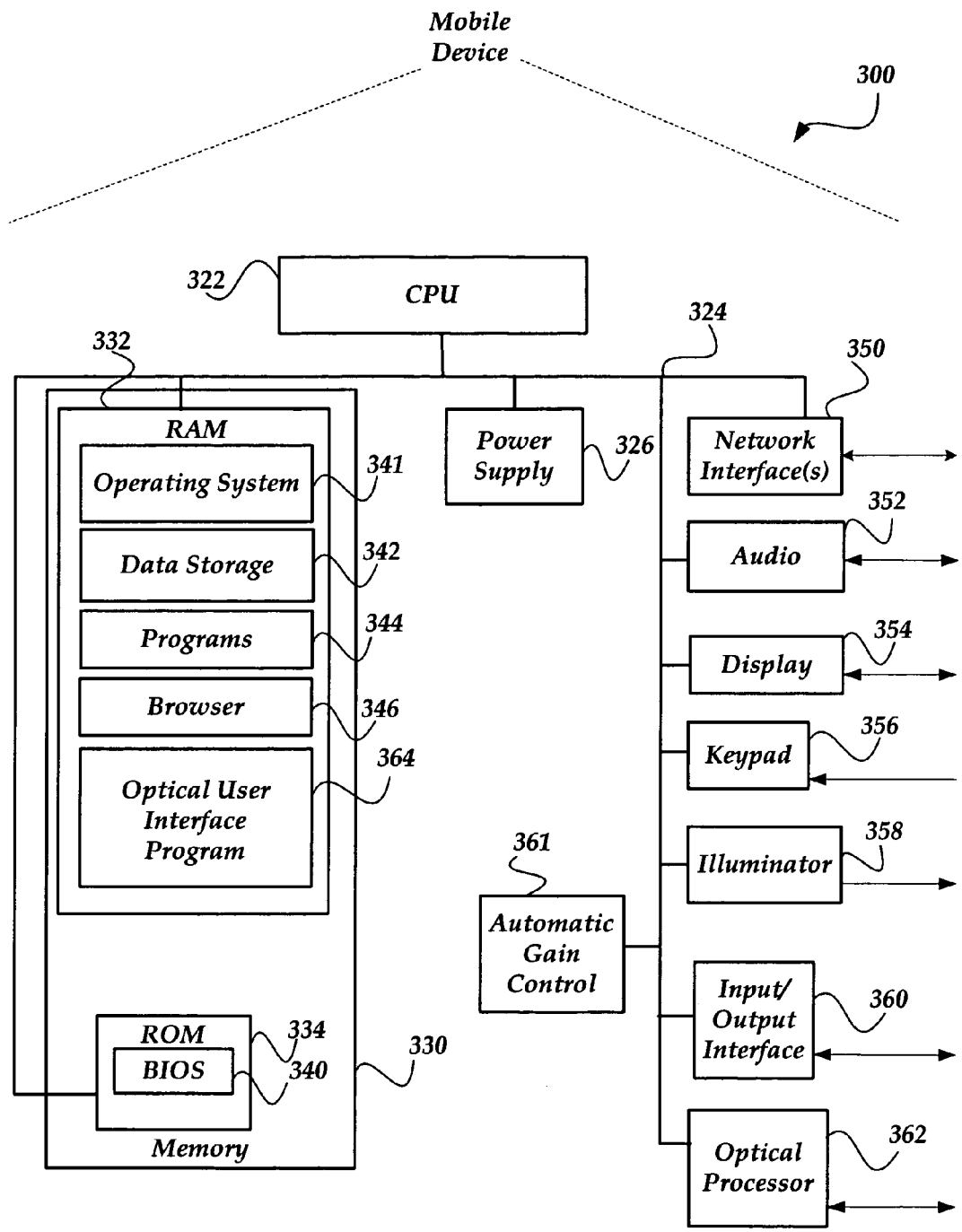
FIG. 3 is a block diagram of an exemplary mobile device.

FIG. 3 shows a functional block diagram illustrating one embodiment of mobile device 300 that may implement the invention. Mobile device 300 may include many more or less components than those shown in FIG. 3. In some embodiments, mobile device 300 can be implemented as a mobile communications device, such as a personal digital assistant (PDA), smart phone, and the like. Mobile device 300 may also include handheld game consoles, tablet computers, notebook computers, remote control devices, media players, microprocessor-based or programmable consumer electronics, wearable computers, and the like. However, the components shown are sufficient to disclose an illustrative embodiment for practicing at least one embodiment of the present invention.

As shown in FIG. 3, mobile device 300 includes a processing unit 322 in communication with a mass memory 330 via a bus 324. Mobile device 300 also includes a power supply 326, one or more network interfaces 350, audio interface 352, display 354, a keypad 356, an illuminator 358, input/output interface 360, automatic gain control 361, and an optical processor 262. Power supply 326 provides power to mobile device 300. A rechargeable or non-rechargeable battery may be used to provide power. The power may also be provided by an external power source, such as an AC adapter or a powered docking cradle that supplements and/or recharges a battery. Optical processor 362 is coupled to an optical interface for optically detecting surface contact with a transparent portion. Additionally, automatic gain control 361 provides for calibrating and/or electronically shuttering the collected light over a range of lighting conditions.

Network interface 350 includes circuitry for coupling mobile device 300 to one or more wireless and/or wired networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), ETHERNET, SMS, general packet radio service (GPRS), WAP, ultra wide band (UWB), IEEE 802.16 Worldwide Interoperabilty for Microwave Access (WiMax), SIP/RTP, or the like.

Audio interface 352 is arranged to produce and receive audio signals such as the sound of a human voice. For example, audio interface 352 may be coupled to a speaker and microphone (not shown) to enable telecommunication with others and/or generate an audio acknowledgement for some action. Display 354 may be a liquid crystal display (LCD), gas plasma, light emitting diode (LED), or any other type of display used to visually display information with a computing device. Display 354 may also include a touch sensitive screen arranged to receive input from an object such as a stylus or a digit from a human hand.

Keypad 356 may comprise any input device arranged to receive input from a user. For example, keypad 356 may include a push button numeric dial, or a keyboard. Keypad 356 may also include command buttons that are associated with selecting and sending images. Illuminator 358 may provide a status indication and/or provide light. Illuminator 358 may remain active for specific periods of time or in response to events. For example, when illuminator 358 is active, it may backlight the buttons on keypad 356 and/or display 354 and stay on while an application is operating. Also, illuminator 358 may backlight these buttons/display in various patterns when particular actions are performed, such as dialing another client device. Illuminator 358 may also cause light sources positioned within a transparent or translucent portion of the case to illuminate in response to actions.

Mobile device 300 also comprises input/output interface 360 for communicating with external devices, such as a headset, or other input or output devices not shown in FIG. 3. Input/output interface 360 can utilize one or more communication technologies, such as USB, infrared, Bluetooth™, and the like.

Mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of mobile device 300. The mass memory also stores an operating system 241 for controlling the operation of mobile device 300. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 330 further includes one or more data storage 342, which can be utilized by mobile device 300 to store, among other things, programs 344 and/or other data. For example, data storage 342 may also be employed to store information that describes various capabilities of mobile device 300. The information may then be provided to another device based on any of a variety of events, including being set as part of a header during a communication, sent upon request, and the like.

Programs 344 may include computer executable instructions which, when executed by mobile device 300, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, codec programs, and so forth. In addition, mass memory 330 stores browser client 346, and Optical User Interface Program 364.

Browser 346 may be configured to receive and to send web pages, web-based messages, and the like. Browser 346 may, for example, receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Optical User Interface Program 364 may be configured to determine the profile for the fingers of a user gripping the mobile device. Additionally, this program may be arranged to enable detecting the lifting, sliding, and/or pressing of one or more fingers against the optical interface of the mobile device to initiate operations by one or more applications, e.g., browser 346, text message client (IM, SMS, MMS, and the like), editor, email, and the like.

Generalized Operation

Figure 4:
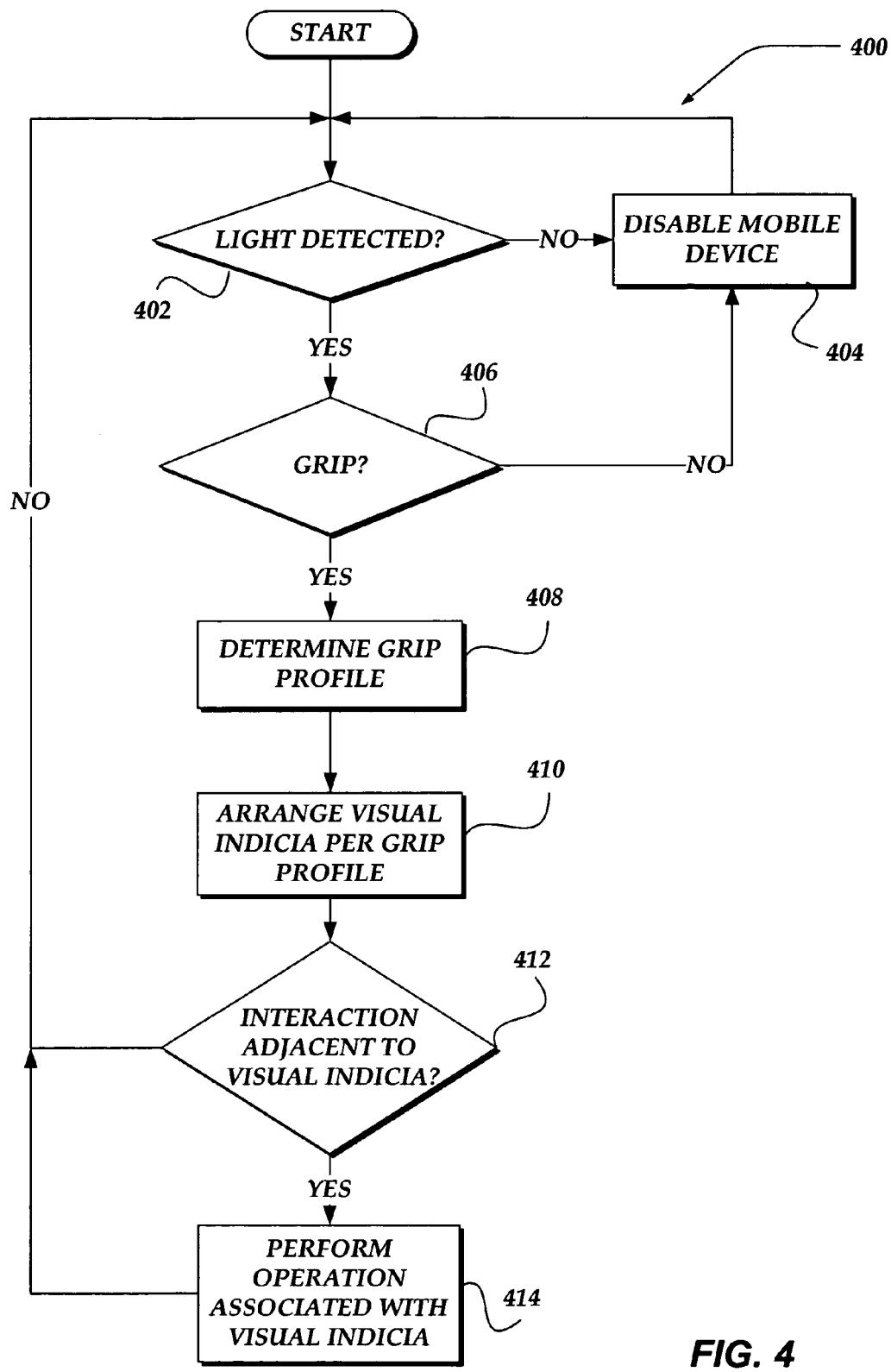
FIG. 4 is a flow chart of a process for optically detecting interaction with a mobile device based on an exterior light source, in accordance with the invention.

The operation of certain aspects of the invention will now be described with respect to FIG. 4.

Moving from a start block, process 400 advances to decision block 402, where a determination is made as to whether or not light is detected. If not, the process advances to block 404 where at least a portion of the operations of the mobile device are disabled and/or placed in a low power consumption mode. From block 404, the process returns to decision block 402 and performs substantially the same actions discussed above again.

However, if the determination at decision block 402 is affirmative, i.e., light from an external light source is detected, the process steps to decision block 406, where a determination is made as to whether or not the user is gripping the mobile device. If not, the process moves to block 404 and performs substantially the same actions discussed above again.

Alternatively, if the determination at decision block 406 is affirmative, the process flows to block 408 where a profile is determined for the user's fingers gripping the mobile device. The profile can include the right or left hand orientation, size of the user's fingers, and the position of the fingers against the optical interface of the mobile device. Flowing to block 410 visual indicators are arranged on the display for the mobile device based on the previously determined profile and which indicate operations that correspond to the positions of one or more of the fingers gripping the mobile device.

Passing to decision block 412, another determination is made as to whether or not an interaction by one or more fingers has occurred adjacent to one or more visual indicia that are displayed on a display for the mobile device. If no such interaction has occurred, such as lifting, sliding, or pressing of one or more fingers against the optical interface of the mobile device, then the process returns to block 402 and performs substantially the actions discussed above. However, if the determination at decision block 412 is affirmative, the process advances to block 414 where an operation associated with the visual indicator is initiated. Next, the process returns to performing other actions.

It will be understood that each block of the above flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustrations support combinations of means for performing the specific actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invent can be made without departing from the spirit and scope of the invention, the invention resides in the claims hereinafter appended.

What is claimed as new and desired to be protected by Letters Patent of the United States is:

1. An optical interface for optically determining interaction by a user with a mobile device, comprising:
    a relatively transparent portion that enables the communication of light between an external environment and an interior surface of the transparent portion;
    a wave guide having an end positioned at an interior surface of the transparent portion, wherein the waveguide is arranged to collect ambient light from the external environment at the end positioned at the interior surface; and
    a processor that is adapted to receive at least the collected ambient light through another end of the wave guide, wherein the processor is arranged to employ an absence of received ambient light from the wave guide to detect a location of at least one finger of a user that is physically interacting with the transparent portion of the optical interface.

2. The optical interface of claim 1, wherein the processor enables actions, including:
    determining a left hand or a right hand orientation of the fingers employed to grip the transparent portion; and
    employing the determined left hand or right hand orientation to configure the operation of an application in accordance with the determined orientation.

3. The optical interface of claim 1, wherein the processor enables actions, including:
    determining a relative size of at least one finger of the user that is gripping the transparent portion; and
    employing the determined relative size of the at least one finger of the user to configure the operation of an application in accordance with the determined finger size.

4. The optical interface of claim 1, wherein the processor enables actions, including disabling at least a portion of the operation of the application until at least the user is determined to be gripping the transparent portion.

5. The optical interface of claim 1, further comprising a component for enabling a remote display to display an animated representation of a virtual hand of the user that is gripping a virtual mobile device, wherein the virtual mobile device includes at least one visual indicia for at least one operation of an application at a position that corresponds to at least one finger of the virtual hand, and wherein the arrangement of the virtual hand and the virtual mobile device in the remote display is based at least in part on at least one finger of the user that is determined to be physically interacting with the transparent portion of the optical interface.

6. The optical interface of claim 1, wherein the collected light is provided by at least one light source that is separate and external to the transparent portion, or a light source that is relatively proximate to the transparent portion.

7. The optical interface of claim 1, further comprising a component for detecting a location of at least one finger of the user that is physically interacting with at least one element, wherein the at least one element includes any combination of capacitive switches, resistive switches, or electro-mechanical switches.

8. The optical interface of claim 1, further comprising a component for enabling a display to display a visual indicia regarding at least one operation of an application at a position that is based on at least one position of a hand of the user that is determined to be gripping the transparent portion.

9. The optical interface of claim 1, wherein the processor enables actions, including enabling at least one operation of the application based at least in part on at least one of a frequency and the position of at least one finger that is determined to be gripping the transparent portion.

10. The optical interface of claim 1, wherein a plurality of wave guides are arranged to collect light at separate and relatively equidistant positions along and adjacent to the interior surface of the transparent portion.

11. The optical interface of claim 1, wherein the transparent portion is formed to prevent an ingress of moisture to the interior surface.

12. The optical interface of claim 1, further comprising automatic gain control that is arranged with the processor to enable its operation over a range of external light conditions.

13. The optical interface of claim 1, further comprising a control that is formed in a material that is at least one of a transparent or translucent material, wherein the control is coupled by another wave guide to the processor that employs an absence of collected ambient light at the control to indicate interaction by the user.

14. The optical interface of claim 1, further comprising a mobile device that is controlled at least in part by determined physical interaction with the exterior surface of the transparent portion.

15. The optical interface of claim 1, further comprising an automatic gain control that is arranged with the processor to enable its operation over a range of light conditions.

16. A method for optically determining interaction by a user, comprising:
    positioning a transparent portion in a case to enable communication of external light through an exterior surface of the transparent portion to its interior surface within the case;
    collecting ambient light at one end of a wave guide, wherein light communicated through the transparent portion is collected through at least one end of the wave guide positioned adjacent to the interior surface of the transparent portion; and
    receiving the collected ambient light through another end of the wave guide, wherein the received ambient light is employed to determine an interaction by the user to initiate an operation with an application.

17. The method of claim 16, further comprising:
    determining a left hand or a right hand orientation of one or more fingers employed to grip the transparent portion; and
    employing the determined left hand or right hand orientation to configure the operation of at least one application in accordance with the determined orientation.

18. The method of claim 16, further comprising:
    determining a relative size of at least one finger of the user that is gripping the mobile device; and
    employing the determined relative size of the at least one finger of the user to configure the operation of at least one application in accordance with the determined finger size.

19. The method of claim 16, further comprising disabling at least a portion of the operation of at least one application until at least the user is determined to be gripping the transparent portion.

20. The method of claim 16, further comprising displaying a visual indicia regarding at least one operation of the application at a position that is based on at least a hand of the user that is determined to be gripping the mobile device.

21. The method of claim 16, further comprising automatically applying gain control for collected light to enable operation over a range of external light conditions.

22. The method of claim 16, further comprising remotely displaying an animated representation of a virtual hand of the user that is gripping a virtual mobile device, wherein the virtual mobile device includes at least one visual indicia for at least one operation of an application at a position associated with at least one finger of the virtual hand, and wherein the arrangement of the virtual hand and the virtual mobile device in the remote display is based at least in part on at least one finger of the user that is determined to be physically interacting with the transparent portion of the optical interface.

23. A mobile device, comprising:

a memory for storing data;

a processor for enabling actions; and an optical interface adapted to detect a physical interaction, including:

a relatively transparent portion that enables the communication of light between an external environment and an interior surface of the transparent portion; and a wave guide having an end positioned at an interior surface of the transparent portion, wherein the waveguide is arranged to collect ambient light from the external environment at the end positioned at the interior surface; and a processor that is adapted to receive at least the collected ambient light through another end of the wave guide, wherein the processor is arranged to employ an absence of received ambient light from the wave guide to detect a location of at least one finger of a user that is physically interacting with the transparent portion of the optical interface.

\* \* \* \* \*

UNITED STATES PATENT AND TRADEMARK OFFICE
CERTIFICATE OF CORRECTION

PATENT NO. : 7,551,814 B1  Page 1 of 1
APPLICATION NO. : 11/358341
DATED : June 23, 2009
INVENTOR(S) : Gerard D. Smits It is certified that error appears in the above-identified patent and that said Letters Patent is hereby corrected as shown below:

Title Pg, Item 57, "Abstract", line 18, before "one" insert -- or --.

In column 1, line 19, delete "affirmatic" and insert -- affirmative --, therefor.

In column 3, line 60, delete "include," and insert -- include --, therefor.

In column 5, line 23, delete "wit" and insert -- with --, therefor.

In column 6, line 46-47, delete "Interoperabilty" and insert -- Interoperability --, therefor.

In column 7, line 35, delete "set" and insert -- sent --, therefor.

In column 7, line 55, delete "SMGL" and insert -- SGML --, therefor.

In column 8, line 56, delete "specific" and insert -- specified --, therefor.

In column 9, line 1, delete "invent" and insert -- invention --, therefor.

Signed and Sealed this

Eighteenth Day of August, 2009

David J. Kappos
*Director of the United States Patent and Trademark Office*